(12) United States Patent
Weinhandl et al.

(10) Patent No.: US 7,938,457 B2
(45) Date of Patent: May 10, 2011

(54) FITTING CONNECTION FOR HIGH-PRESSURE HOSES

(75) Inventors: Franz Weinhandl, Weisslingen (CH); Maxim Levin, Weinham (DE)

(73) Assignee: Parker Hannifin GmbH & Co. KG, Bielefeld (DE)

( * ) Notice: Subject to any disclaimer, the term of this patent is extended or adjusted under 35 U.S.C. 154(b) by 82 days.

(21) Appl. No.: 12/577,435

(22) Filed: Oct. 12, 2009

(65) Prior Publication Data

US 2010/0059991 A1    Mar. 11, 2010

Related U.S. Application Data

(63) Continuation of application No. PCT/EP2008/008953, filed on Oct. 23, 2008.

(30) Foreign Application Priority Data

May 15, 2008   (DE) ............... 20 2008 006 612 U

(51) Int. Cl.
*F16L 21/00*   (2006.01)

(52) U.S. Cl. ........................ 285/419; 285/373

(58) Field of Classification Search .......... 285/383, 285/238, 372, 373, 242, 239, 370, 371, 419, 285/397, 99, 95, 398
See application file for complete search history.

(56) References Cited

U.S. PATENT DOCUMENTS

| | | | | |
|---|---|---|---|---|
| 1,043,806 A | * | 11/1912 | Dahl .................. | 285/148.18 |
| 1,985,012 A | * | 12/1934 | Boehm .................. | 285/190 |
| 2,383,010 A | * | 8/1945 | Miller .................. | 285/249 |
| 2,837,351 A | * | 6/1958 | Bailey .................. | 285/52 |
| 3,041,088 A | * | 6/1962 | Brandon, Jr. .......... | 285/33 |
| 3,195,931 A | * | 7/1965 | Braunagel ............. | 285/70 |
| 3,902,747 A | * | 9/1975 | Weinhold ............. | 285/369 |
| 3,930,674 A | | 1/1976 | Jonsson | |
| 4,236,736 A | * | 12/1980 | Anderson ............. | 285/125.1 |
| 4,432,759 A | * | 2/1984 | Gross et al. .......... | 604/411 |
| 4,473,369 A | * | 9/1984 | Lueders et al. ....... | 604/244 |

(Continued)

FOREIGN PATENT DOCUMENTS

DE   3921443 A1 *  1/1991

(Continued)

OTHER PUBLICATIONS

The International Search Report dated Jan. 26, 2009 in corresponding International Application No. PCT/EP2008/008953.

*Primary Examiner* — Aaron Dunwoody
(74) *Attorney, Agent, or Firm* — John A. Molnar, Jr.

(57) ABSTRACT

A connection assembly for a hose end. The assembly includes a fitting, a connector, and a shell formed of a pair of closable halves. The a fitting includes a nipple having a first end insertable in the hose end and a second end, a flange surrounding the nipple, and a sleeve disposed over the nipple first end. With the hose end being inserted between the sleeve and the nipple, the second nipple end being slidably received coaxially in the connector, and the shell halves being closed over the fitting with the flange being received in a first cavity portion thereof, and with the connector being received in a second cavity of the shell, the fitting is slidably movable in the shell responsive to fluid pressure from a release position to a locked position wherein the flange interferingly engages the first cavity portion preventing the shell halves from being opened.

12 Claims, 7 Drawing Sheets

U.S. PATENT DOCUMENTS

| | | | | |
|---|---|---|---|---|
| 4,669,760 A | * | 6/1987 | Hashish et al. | 285/272 |
| 4,741,559 A | * | 5/1988 | Berghman | 285/45 |
| 5,269,572 A | * | 12/1993 | Mefferd | 285/330 |
| 5,454,603 A | * | 10/1995 | Staley, Jr. | 285/14 |
| 5,738,384 A | * | 4/1998 | Boehme | 285/114 |
| 5,853,200 A | * | 12/1998 | Zieres | 285/45 |
| 5,895,076 A | * | 4/1999 | Elliott | 285/14 |
| 6,508,807 B1 | * | 1/2003 | Peters | 604/533 |
| 6,565,129 B2 | * | 5/2003 | Surjaatmadja | 285/373 |
| 6,913,294 B2 | * | 7/2005 | Treverton et al. | 285/406 |
| 7,537,245 B2 | * | 5/2009 | Cross, Jr. | 285/242 |
| 7,648,176 B2 | * | 1/2010 | Van Bilderbeek | 285/95 |
| 7,874,596 B2 | * | 1/2011 | Kertesz et al. | 285/417 |
| 2002/0195820 A1 | * | 12/2002 | Surjaatmadja | 285/373 |
| 2004/0227347 A1 | * | 11/2004 | Fundin et al. | 285/419 |

FOREIGN PATENT DOCUMENTS

| | | |
|---|---|---|
| DE | 199 40 147 A1 | 3/2001 |
| DE | 199 39 161 C1 | 6/2001 |
| DE | 20 2004 002 063 U1 | 4/2004 |
| DE | 20 2006 007 315 U1 | 7/2006 |
| DE | 20 2006 015 598 U1 | 12/2006 |
| EP | 0 836 043 A1 | 4/1998 |
| WO | 2006/002459 A1 | 1/2006 |

* cited by examiner

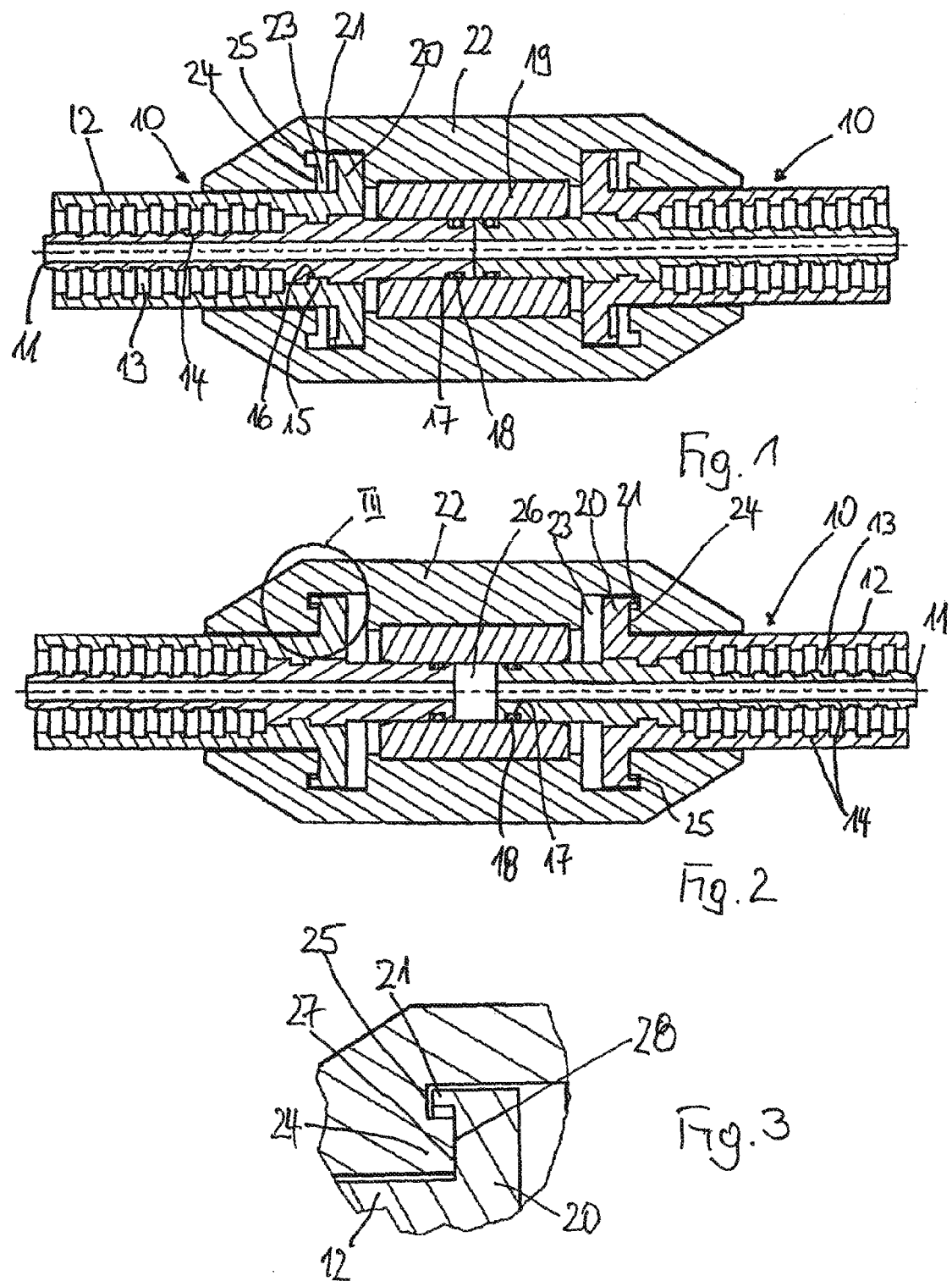

FITTING CONNECTION FOR HIGH-PRESSURE HOSES

CROSS REFERENCE TO RELATED APPLICATIONS

This application is continuation of copending International Application No. PCT/EP2008/008953 filed Oct. 23, 2008, which designated the United States, and which claims priority to German Patent Application No. DE 20200806612.3, filed May 15, 2008, the disclosure of each of which is expressly incorporated herein by reference.

BACKGROUND OF THE INVENTION

The present invention relates to a joining and connecting device for high-pressure lines, to join a hose line to another hose line or to a device operating at high pressure, whereby the end of the hose line is provided with a hose fitting that consists of a nipple pushed into the interior of a hose body and a sleeve placed on the exterior of the hose body that can be connected to the nipple and pressed out on the hose body.

To the extent that several segments of hose line must be coupled together in high-pressure applications by means of suitable connecting devices or a hose line is to be jointed to a device operating at high pressure, known joining and connecting devices are constructed as screw connections. Such a screw connection is described in DE 20 2006 007 315 U1. To the extent that in the known screw connection an end piece is firmly connected to the hose line, this document gives no information about the way in which the attachment of the end piece to the hose line should be accomplished.

A disadvantage in the known screw connection, however, is its expensive structure, with several individual parts, and the screw connection is partly produced with the aid of a tool. Sealing such a screw connection is also complicated, for which a special connecting part is provided in the known screw connection.

Furthermore, to the extent that hose lines are to be connected to one another or to a working device, hose fittings are known for this, which consist of a nipple that can be pushed into the interior of a hose body and sleeve placed on the exterior of the hose body that can be connected to the nipple and pressed out on the hose body. The nipple projecting from the end of the hose is then suitable to be brought to be connected to fittings of other hoses or working devices. Such a hose fitting according to characteristics if this kind is described, for example, in DE 20 2006 015 598.

SUMMARY OF THE INVENTION

The present invention is directed to providing a joining and connecting device for high-pressure lines which is simple to construct and handle.

The invention envisions, in its basic idea, that the hose fittings connected to the hose bodies have a radially separated flange ring, that the end of the nipple projecting out from the hose body has a seal placed on its outer circumference, and can be pushed together with the seal into a receiving box connector, and that the receiving box connector and the radially separated flange ring, including a half-shell enclosing an adjacent segment of the outer sleeve are enclosed as a joining and connecting device, whereby one of the indentations in the flange ring that serves to receive it, is dimensioned in the half-sleeve in such a way that an axial movement of the hose end between a release position and a locking position for the half-shell formed on the front of the half-shell by a form-tight contact of the flange ring with a receiving device formed on the front of the half-shell is made possible.

First of all, the advantage of a simple structure of the joining and connecting device is connected with the invention. For use of the joining and connecting device according to the invention, only a nipple or sleeve of the hose fitting has to be changed in order to form the required flange ring. The receiving box connector and the two half-shells are envisioned as additional components, all of which have a simple structure. To the extent that in an assembled connection the front ends of the nipple are provided with a seal located on it in the receiving box connector, a simple sealing is associated, without additional sealing steps. A secure locking of the joining an connecting device is effected by applying an appropriate high pressure to the hose line, in that the corresponding flange ring of the hose in the axial space enclosed by the half-shell is moved into a form-tight contact with the half-shell, in such a way that the half-shells can no longer be removed from the hose fitting, which is under pressure.

In contrast, a disassembly of the joining and connecting device is possible in a simple manner in the pressure-free state, since the hose fittings involved are to be moved far enough into the interior of the half-shells until the flange ring comes out of contact with the half-shell and it can be removed to the outside. In an advantageous way, the half-shells thus have a double function, namely both a holding function for the hose fitting and a protective function, to the extent that half-shells are attached to the hose fittings, and in the case the nipple breaks, the hose is prevented from whipping around.

According to one embodiment example of the invention, it is envisioned that the flange ring makes contact with projection that protrudes from the hose body in the axial direction into a groove formed in the half-shell as a receiving device. The flange ring may be formed on the front end of the sleeve, whereby the flange ring can be a one-piece component of the sleeve. Alternatively, the flange ring may be mounted to one of the regions of the nipple protruding from the hose body, between the sleeve and the receiving box connector. In this case, the flange ring can be attached to the nipple, for example, by being welded on or in another way.

To the extent that, according to an embodiment example of the invention, it is envisioned that the receive box connector has a length such that the front end of the seal, which has the seal, is inside the receiving box connector in both the release position and the locking position, it is thereby provided that in each position of the hose fitting within the receiving space formed by the half-shells, a secure sealing of the nipple against the receiving box connector is assured.

In an first embodiment of the invention, it is sufficient that when, after the closing of the half-shells by an axial movement of the hose end with the hose fitting, the flange ring in the receiving indentation is brought into a form-tight contact with the half-shells. If, after this, the joining and connecting device is placed under pressure, this locked state is maintained securely.

In addition, however, other means of fixing the half-shells to each other in their closed position can be envisioned.

Thus, according to an embodiment example of the invention, it can be provided that the half-shells enclosing the two receiving box connectors and the flange ring are held together in their closed position by means of a curved spring clamp placed on their outer circumferences, whereby it can be provided that the each of the half-shells has a pull for flush receiving of the curved spring clamps. With this, it is assured that the spring clamps do not protrude beyond the outer circumference of the joining and connecting device.

In an alternative embodiment, it can be envisioned that the half-shells are held together in their closed position by means of U-shaped spring plugs plugged in radially at their outer ends.

In another alternative embodiment, it can be envisioned that the half-shells are held together in their closed position by means of external hinge. In this case, the hinge axis of the hinge spans the half-shells in their pre-stressed closed position, and with the half-shells held by spring blades.

According to another embodiment of the invention, a curved spring clamp can again be envisioned to hold the two half-shells together, held to the hinge axis at one end by an appropriately provided hinge. The hinge axis can be brought to the two half-shells by means of hinge bands, each preferably attached by welding.

According to one embodiment example of the invention, it is further envisioned that the receiving box connector is surrounded in a form-tight manner by the half-shells and attached immovably to it the axial direction.

To the extent that the joining and connecting device according to the invention is envisioned to connect two hose lines, it is envisioned according to one embodiment example that the half-shells are surrounded and held together by the flange rings of the two hose fittings of the hose lines to be brought together, including the receiving box connectors arranged in between.

To the extent that the corresponding device is envisioned for joining a hose line to a high-pressure working device, the corresponding connection is accomplished by the receiving box connectors being connected to the working device and the half-shells being attached immovable to the receiving box connectors or to the working device.

According to another embodiment example of the invention, another hose line, again for joining a hose line to a high-pressure working device or else to other hose lines having standardized hose connections, is envisioned that the receiving box connector is constructed as an adapter connecting the working device or the hose connection, whereby the corresponding flange ring is constructed on the front end of the adapter, preferable in one piece, whereby the hose fitting of the hose line to be connected to the flange ring is brought to the adapter together with the flange ring applied to it. In each alternative embodiment example, it can also be envisioned that an outer thread is applied to the free connected end of the adapter for the adapter to be screwed into, for example a connection formed on a working device or, alternatively, an inner thread to join the standardized screw connection of a hose line.

To the extent that, to protect the joining and connecting device it is required, in a known way, to close the open ends of the hose fittings by means of a protective cap, the problem exists that in the case of mounted hose lines, the protective cap should be kept on the hose fitting, in order to be able to use the joining and closing abilities of the hose fittings in further handling. For this, according to one embodiment example of the invention, it is envisioned that a protective cap is held removably on the hose fitting to cover the open end of the hose fitting, and the hat-shaped protective cap has a protective region for an axially enclosing plug on the open end of the hose fitting an adjacent holding area on the protective region with a outward-curved wall region for radial plugging in of the protective cap on the outer circumference of a segment of sleeve of the hose fitting. Connected with this is the advantage that the protective cap placed on the open end of the hose fitting is removed during mounting of the hose fitting and can itself be held by being plugged into the hose fitting and thus not be lost.

In regard to the formation of the protective region, it can be envisioned that the protective region consists of an element protruding from the interior of the closed cover region for being plugged on the end of the hose fitting, whereby the holding function of the protective cap can be achieved by the outward-curved wall region of the protective can being formed as a spring.

In a further development of the joining and connecting device with a protective cap attached to it, it is envisioned, according to one embodiment example, that the protective cap is plugged onto the hose fitting after mounting, is also applied for additional security against detachment of the joining and connecting device, whereby it is envisioned for this that in each case, the hat-shaped protective cap is fixed axially by means of a projection that fits into a groove formed on the outer side of the sleeve in its plugged position on the hose fitting, and the groove is arranged in such a way that an axial movement of the hose fitting with the protective cap plugged onto it to the half-shells is excluded. Since it is required for detaching the joining and connecting device that the hose fitting involves be able to move axially within the interior of the half-shell until the flange ring comes to contact the half-shell, an additional security of the joining and connecting device is achieved in its connected position by means of the protective cap being plugged in and fixed axially, to the extent that the hose fitting involved cannot move axially.

According to the use of the joining and connecting device, especially for high-pressure hoses, additional arrangement of a protective hose pushed over the outside of the high-pressure hose can also be envisioned; such a protective hose is described in WO 2006/002459 A1. In this case, there is a problem, in that each end of the protective hose must be attached in the region of the hose fitting or the joining and connecting device, whereby the protective hose is generally attached in the region of the nipple of the hose fitting. To the extent that this nipple is subject to the risk of a breakdown, the protective hose cannot fulfill its protective function in such a case.

Also in regard to the attachment of the protective hose, the design according to the invention offers an appropriate starting point, so, according to one embodiment example of the invention, it is envisioned that a protective hose enclosing the high-pressure line with the outside of the hose fitting is provided, which is pushed onto its end arranged over the over the region of the sleeve projecting from the half-shell and attached to it by means of press sleeve applied to its outside, and that the width of the protective cap the a position of press sleeve applied to the sleeve are determined with respect to each other in such a way that the protective cap can be inserted between the half-sleeve and the press sleeve as an axial thrust bearing in such a way that an axial movement of the hose fitting as far as the half-shell is excluded. For in the embodiment according to the invention, it is sufficient that the protective hose is attached to the sleeve by means of a hose fitting, in a known way. Even when, for example, the nipple breaks off under the flange ring, the hose connected to the hose fitting, preferably a high-pressure hose, is still held by the half-shells, so that the joining and connecting device does not have to be overlapped by the protective hose.

According to one embodiment example of the invention, it is envisions that the protective hose consists of a flexible and extendable material. It is thereby assured that in case of tension force that is too high affecting the hose line, in each case, the more stiffly formed inner high-pressure line tears first, and the flexible protective hose remains connected to the hose fitting.

The present invention, accordingly, comprises the construction, combination of elements, and/or arrangement of parts and steps which are exemplified in the detailed disclosure to follow.

BRIEF DESCRIPTION OF THE DRAWINGS

For a fuller understanding of the nature and objects of the invention, reference should be had to the following detailed description taken in connection with the accompanying drawings wherein:

FIG. 1 shows a joining and connecting device for two hose-line ends before the pressure effect in the release position of the joining and connecting device, in cross-section;

FIG. 2 shows the joining and connecting device of FIG. 1 in the locked position of the joining and connecting device under the effect of pressure;

FIG. 3 shows detail III from FIG. 2;

Figures 4, 5:
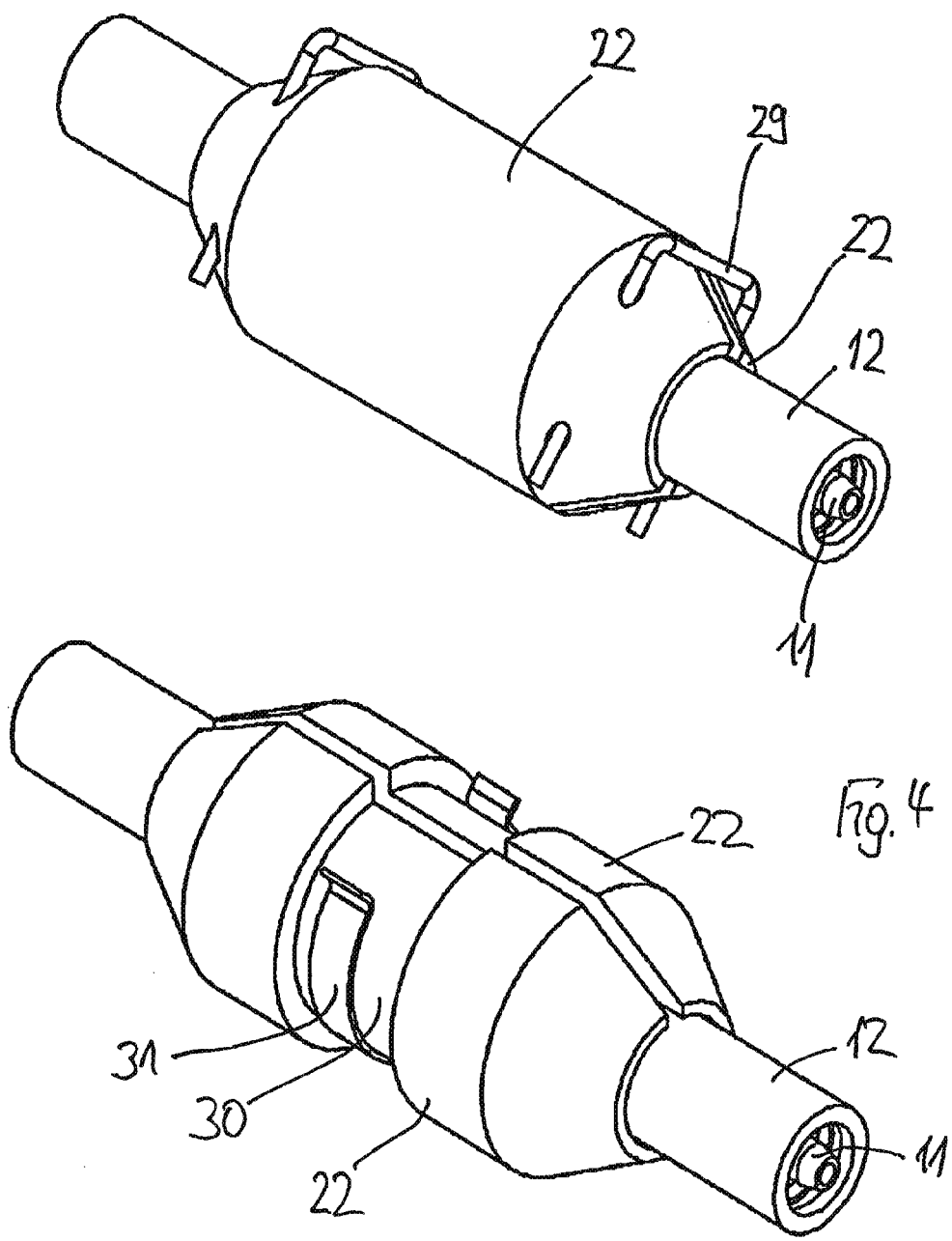
FIG. 4 shows the joining and connecting device according to FIG. 1 in a view with half-shells found in its closed position.
FIG. 5 shows the joining and connecting device of FIG. 4 in another embodiment.

The drawings will be described further in connection with the following Detailed Description of the Invention.

DETAILED DESCRIPTION OF THE INVENTION

As results first from FIG. 1, two hose fittings 10 of high-pressure hose lines, not shown further, are connected to each other. Each hose fitting 10 consists of a nipple 11 to be move in the interior of a hose body, not shown, and an outer sleeve 12. Between the nipple 11 and the sleeve 12, there is a ring space 13 to receive the hose body, whereby on the outer side of the nipple 11 and also on the inner side of the sleeve 12, teeth 14 are formed, which, when the sleeve 12 is pre-pressed with the hose body, mesh with the hose body and thereby produce a firm connection between the hose fitting 10 and the hose body in each case.

In the region above the ring space 13 to receive the hose body, the sleeve 12 is provided with projection 15 that can be pressed into a groove 16 formed on the nipple 11, so that the firm connection between the nipple 11 and the sleeve 12 is also supported by this. On its outermost front end, the nipple 11 has another groove 17 to receive a sealing ring 18 inserted into it. With this front end and the seal 18 inserted into it, the two nipples 11 of the two hose fittings 10 to be connected are pushed into a centrally arranged receiving box 19, until the front sides of the two nipples meet each other.

At their front ends, the two sleeves 12 each have a flange ring 20 as a one-piece component at a distance from it, which has a projection 21 in the direction of the hose fitting 10.

The two flange rings 20 next to the receiving box 19 between them are enclosed by two half-shells placed outside them, whereby the half-shells 22 each extend further over a partial region of each sleeve 12 of the hose fitting 10. Inside them, the two half-shells placed together form a receiving indentation 23 that is oriented to receive the flange ring 20 with projection 21 of the hose fitting 10 in a suitable manner. The receiving indentation 23 in this case has an axial extent such that the two flange rings 20 in can move axially to a certain extent, which will be explained later. At their front sides 24 facing the projections 21 of the flange rings 20, the two half-shells 22 each have a groove 25 to receive the other projection 21.

FIG. 1 also shows the starting and mounted position of the joining and connecting device, in which the half-shells 22 can be turned outside the two hose fittings 10 connected to each other and the receiving box 19, but they can also be removed from the position shown in FIG. 1, so that the connection of the two hose fittings can be detached.

FIG. 2 now shows another assembly step, in which the two hose fittings 10 can each be pushed outward, into the grooves 25 arranged on their projections 21 located on the flange rings 20 mesh. The nipples 11 thereby move from each other, and an intermediate space 26 is formed in the interior of the receiving box 19. If the joining and connecting device thus assembled is now placed under pressure, the pressure acting axially in the intermediate space 26 leads each of the projections 21 being pushed into the corresponding grooves 25 of the half-shells 22, as shown in detail in FIG. 3.

Because of the design, at the corresponding front side 25 of the half-shell 22, a projection 27 results that meshes into the formation of the projection on the back projection 28 on the flange ring 20. The forward projection 27 and the back projection 28 thus form together a locking for the outer half-shells 22 with the sleeve 12 or their flange ring 20, in such a way that in the pressed-in position, the half shells 22 cannot be opened when under pressure. A secure connection is thereby created of the two hose fittings 10 together, which are simple to detach in the pressure-free position, in which the two hose fittings 10 are pushed back axially into the position shown in FIG. 1.

Although it is sufficient that the two half-shells 22 are held in position by the pressing pressure alone, it can be appropriate to provide an additional attachment of the half-shells 22 to each other.

For this, FIG. 4 shows, in a first embodiment example, an arrangement of U-shaped of spring plugs 29, each of which is led through the two half-shells 22 in such a way that the half-shells 22 are attached to each other.

An alternative possibility is shown in FIG. 5. For this the two half-shells 22 have an indentation 30, in which a spring clamp 31, which is curved forward, is arranged, surrounded on the outside, which serves to every case to hold the half-shells 22 together.

Figure 6:
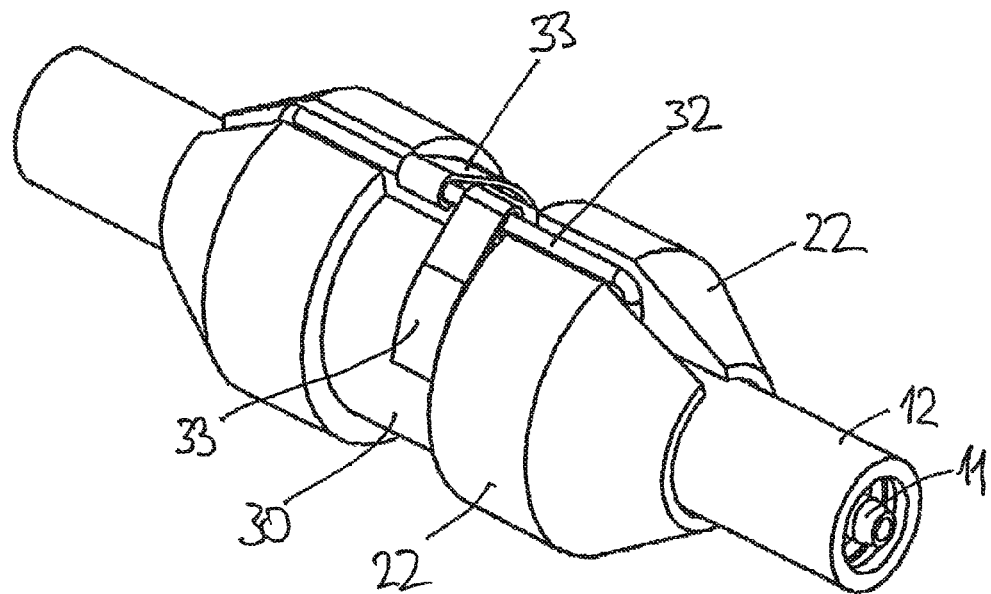
FIG. 6 shows the joining and connecting device of FIGS. 4 and 5 in another embodiment.
Figure 7:
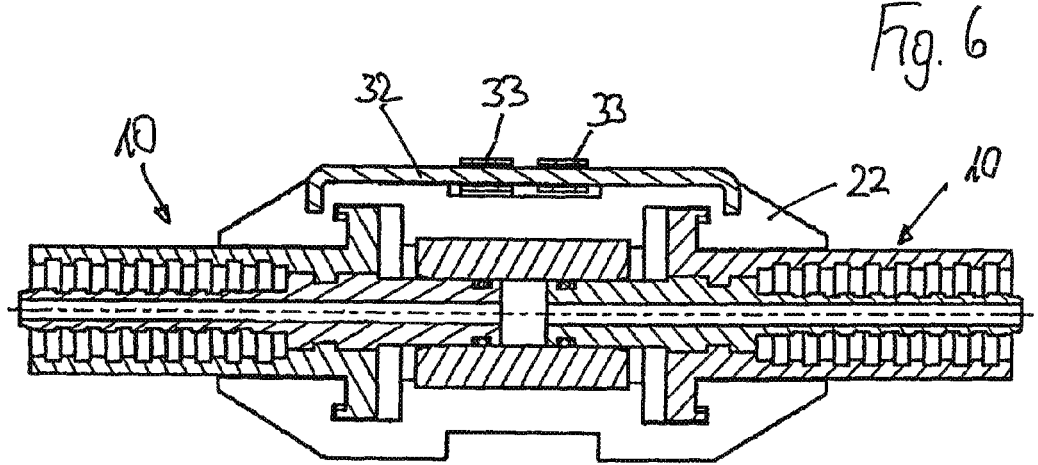
FIG. 7 shows the joining and connecting device of FIG. 6 in cross-section.

Yet another embodiment is shown in FIGS. 6 and 7, in which the two half-shells 22 are held together by means of an outside hinge axis 32. At the hinge axis 32, spring blades can be mounted to rotate on bearings, which, in turn, press on the half-shells 22 with pre-tension and attach them in the closed position.

Figure 8:
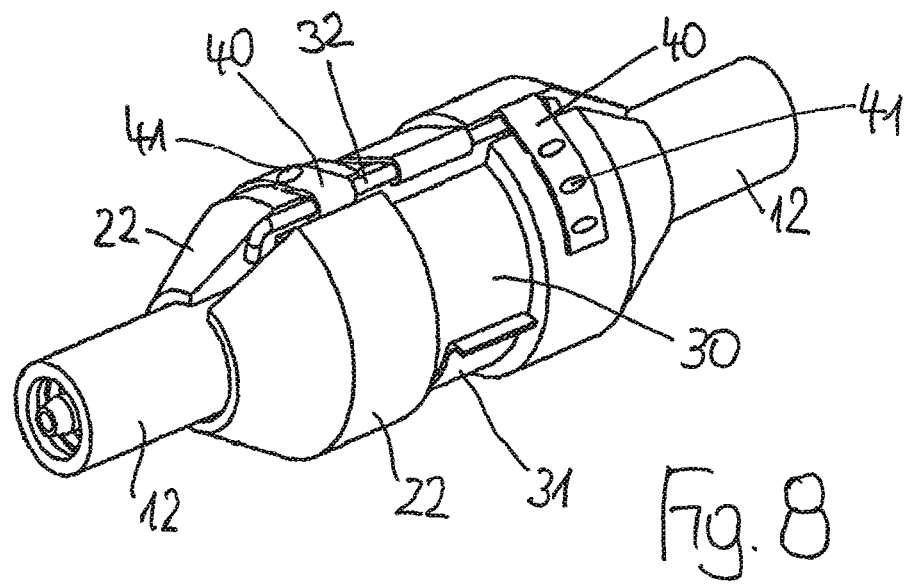
FIG. 8 shows another embodiment example of the joining and connecting device of the two half-shells according to FIGS. 4 through 7.

FIG. 8 shows an embodiment that consists of a combination of the embodiments shown in FIG. 5 and in FIGS. 6 and 7. The half-shells 22 are again held together by a spring clamp 31 this curves forward, whereby one end of the spring clamp 31 is held so as to rotate on bearings about a correspondingly arranged hinged axis 32. The hinge axis 32 is held in each case by hinge bands 40 applied to the two half-shells 22 by means of weld points 41.

Figure 9:
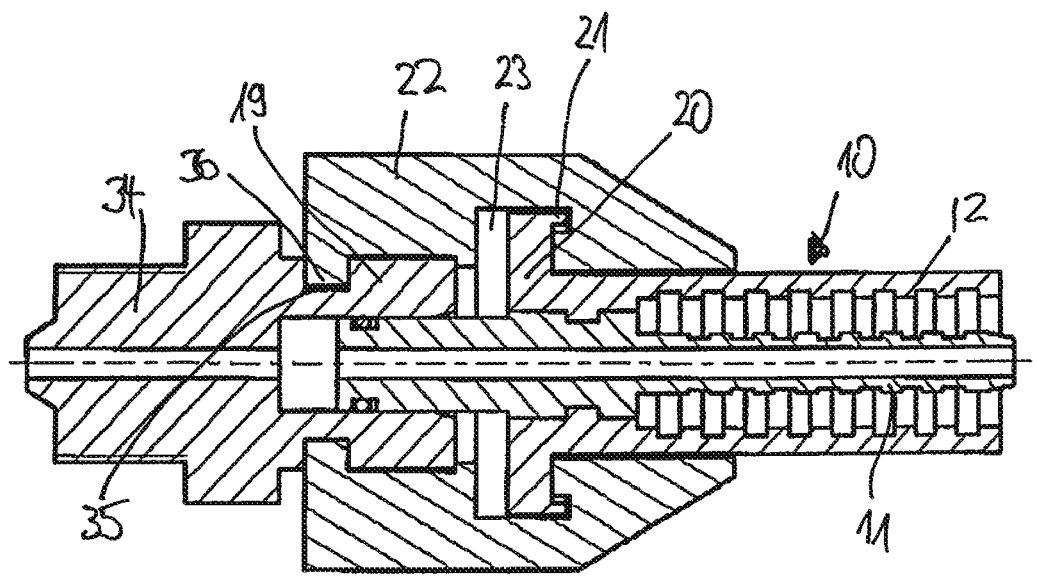
FIG. 9 shows a joining and connecting device for a hose line to a working device, in cross-section.
Figure 10:
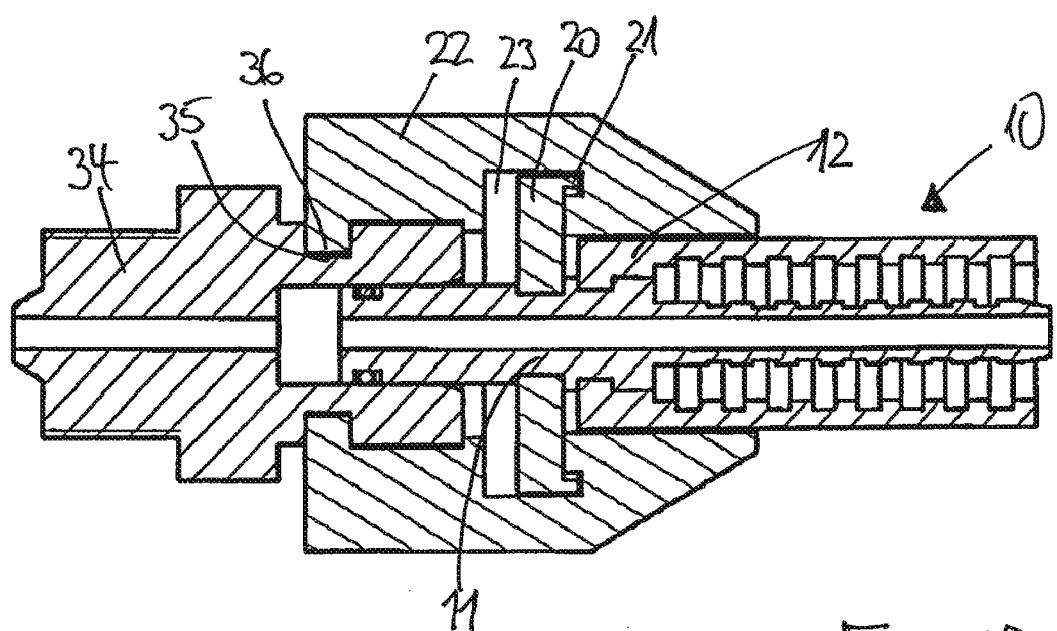
FIG. 10 shows the joining and connecting of FIG. 9 in another embodiment.

As results from FIGS. 9 and 10, the joining and connecting device according to the invention can also be designed to attach a hose fitting 10 applied to a high-pressure hose to be connected on a high-pressure working device, not shown further. In this case, the receiving box 19 forms a component of a connection 34 of the working device, not shown further, whereby the half-shells 22 mesh with a groove 25 formed on the outer circumference of the receiving box 19 with a hook 36 formed on its axial end. The half-shells 22 are in turn attached axially in an irreversible manner, so that they can serve as a thrust bearing for the contact of the flange ring 20 with the projection 21, as is described especially in FIGS. 1 through 3.

The embodiment example show in FIG. 10 differs from the one shown in FIG. 9 in that the flange ring 20 with the projection 21 is no longer located on the sleeve 12, but is applied directly to the nipple 11 and firmly connected to it, for example, welded to it. This other attachment of the flange ring 20 has, however, no effects on the described function of the joining and connecting device according to the invention.

Figure 11:
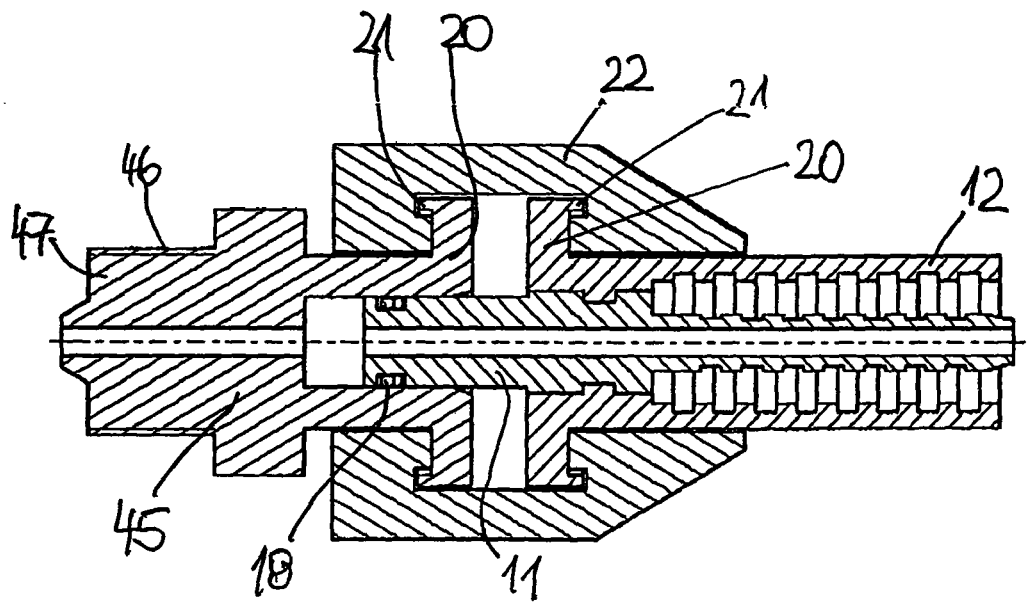
FIG. 11 shows another embodiment example of the joining and connecting device according to FIG. 9.

In the embodiment example shown in FIG. 11, an adapter 45 forms a component of the joining and connecting device according to the invention, which offers a joining possibility with its free end 47. Thus the free end 47 of the adapter 45 can be designed with an outside threading 46 for the adapter to be screwed into a connection formed on a working device. Alternatively, however, it is also for the free end 47 to be designed correspondingly hollow and provide it with an inside threading, so that a hose line with a standard screw connection can be connected to the hose line. The adapter 45 has at the same time, in its region surrounded by the half-shells 22, the function of the receiving box 19 in the embodiment examples of the invention described previously, in that the nipple 11 with the sealing ring 18 on it can be pushed into the adapter 45. On the front side, the flange ring 20 is arranged, preferably in one piece, with the projection that meshes with the half-shells 22, and to this extent, the adapter 35 corresponds in its handling in the context of the joining and connection device, to the embodiment example described, for example in FIGS. 1 through 3.

Figure 12:
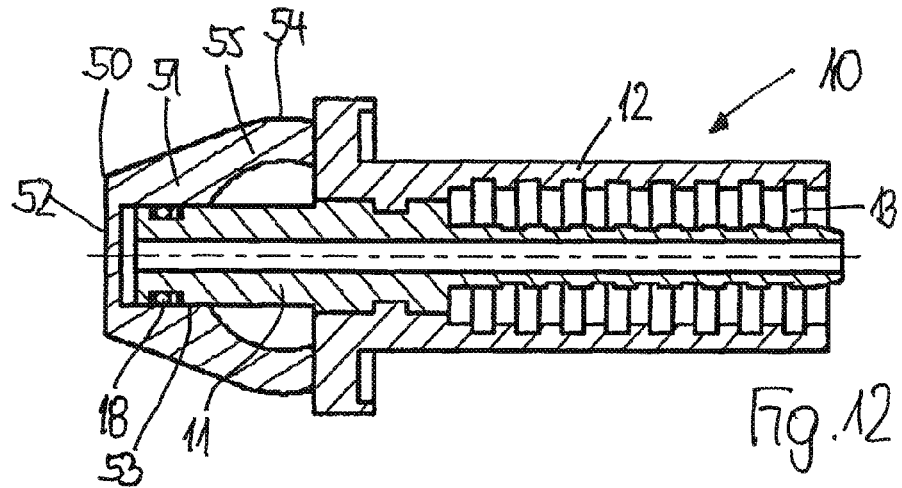
FIG. 12 shows a hose fitting with one of its open ends provided with a protective cap.
Figure 13:
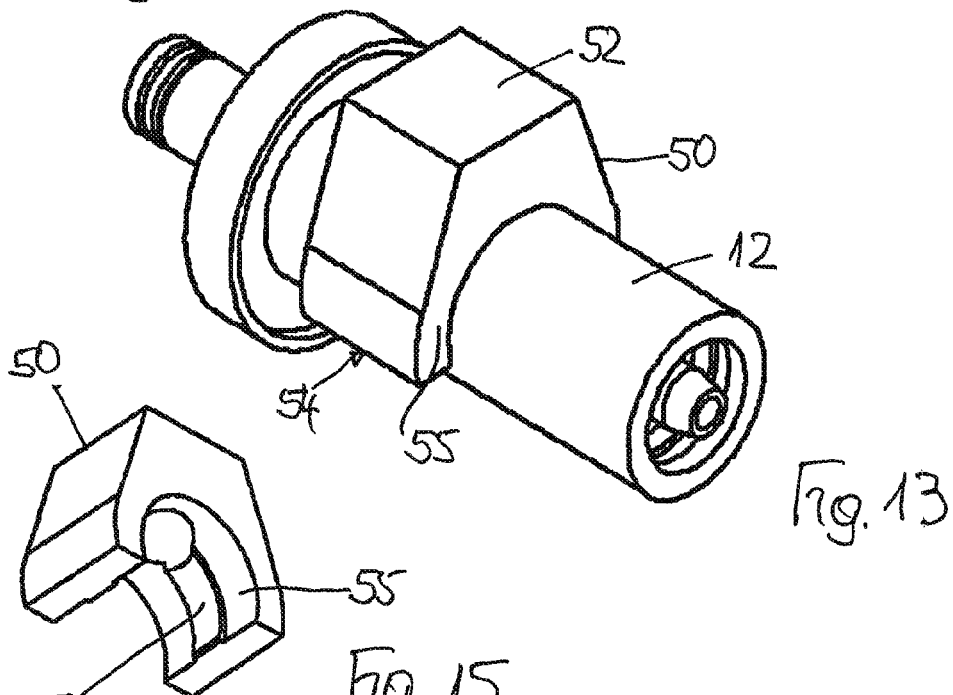
FIG. 13 shows the fitting of FIG. 12 with a protective cap provided on the sleeve region of the hose fitting.

It is common for hose fittings 10 of this kind to be protected on their free ends before mounting by placement of a protective cap, and to this extent, the joining and connecting device according to the invention according to FIG. 12 includes a protective cap 50 of this kind. This protective cap 50, formed in a known way in the shape of a hat, has, starting from its closed cover area 42, a first protective region 41, with which the protective cap 50 can be placed on the nipple 11 of the hose assembly 10. In the embodiment example shown, the protective area 41 consists of an element 53 that projects on the inside from the closed cover region 52, which is designed to be placed on the nipple 11 of the hose fitting 10. Axially to the protective region 21, it is adjacent to a holding region 54, which as a outward-curved wall region 55 of the protective cap 50, which is formed in a spring construction in such a way and designed so that the protective cap 50, after being pulled away from the nipple 11 on the sleeve 12, can be plugged into the hose fitting 10 and can be attached thereby to the hose fitting 10. To this extent, the protective cap 50, when mounted on the hose assembly with the assembled hose assembly is itself held firmly and remains available for a new protective function during further handling of the hose assembly 10, as can be seen from FIG. 13.

Figure 15:
FIG. 15 shows the protective cap according to FIG. 14 in a detailed perspective presentation.
Figure 14:
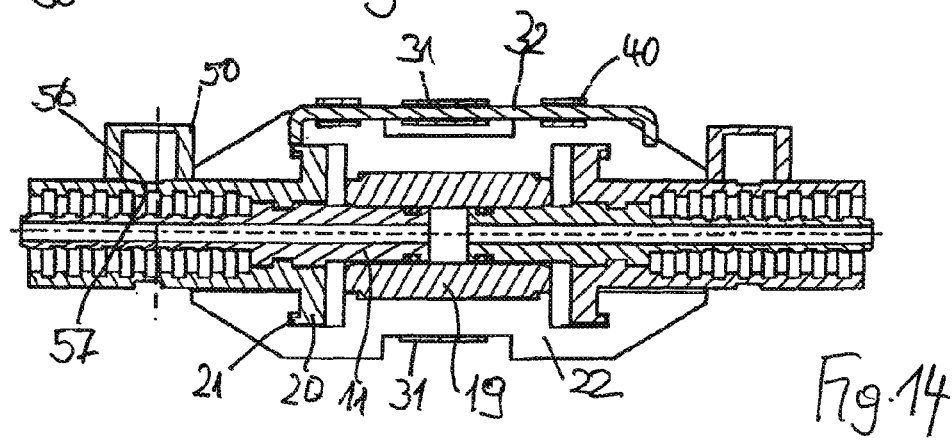
FIG. 14 shows the fitting of FIG. 12 in another embodiment with a protective cap attached axially to the sleeve segment of the hose fitting.
Figure 16:
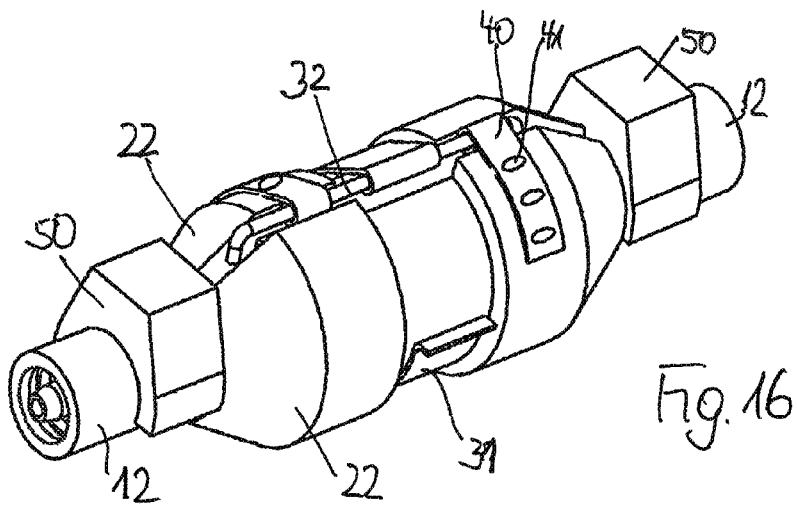
FIG. 16 shows the fitting of FIG. 14 in a perspective view.
Figure 17:
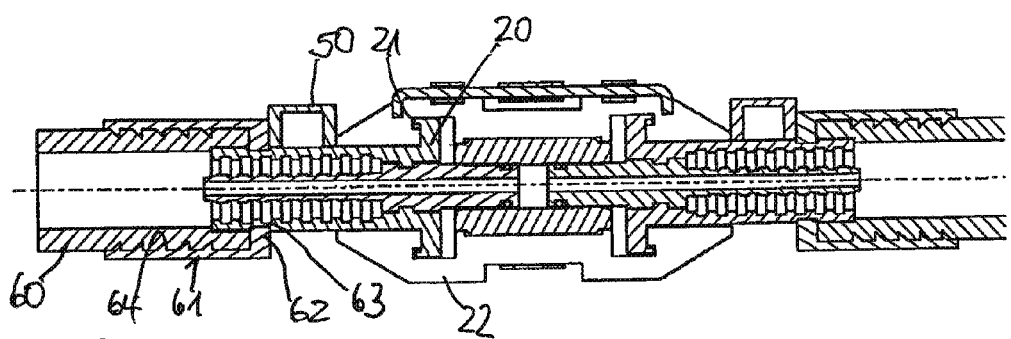
FIG. 17 shows the joining and connecting device according to FIG. 14, with an outer protective sleeve included.
Figure 18:
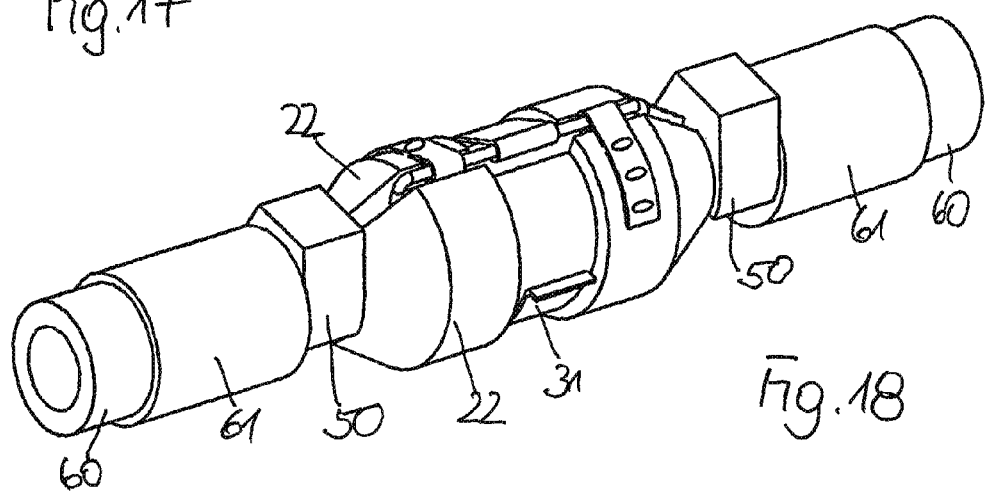
FIG. 18 shows the joining and connecting device of FIG. 17 in a perspective view.

The protective cap 50 can be given another function according to the embodiment example shown in FIGS. 14 and 15, when the protective cap 50 in its outward-curved region 55 is provided with an inward protruding projection 56 that corresponds to a groove formed on the outer circumference of the sleeve 12 of the hose assembly 20. With the protective cap 50 plugged into the sleeve 12, when the projection 56 meshes into the groove 57, the protective cap is attached axially to the hose 10 assembly in an irreversible manner. According to the invention, it is envisioned that the groove 27 on the sleeve 12 is arranged in each case in such a way that an axial movement of the hose fitting 10 equipped with a protective cap 50 to the half-shells 22 is excluded. Since, however, a movement of the hose fitting 20 to the half-shells 22 is necessary for detachment of the joining and connecting device, an additional securing of the joining and connecting device against detachment is achieved with this kind of design. Such a joining and connecting device is shown again as a whole in FIG. 16.

To the extent, especially during use of the joining and connecting device in high-pressure hoses, and external protective hose is used, pulled over each high-pressure hose and hose fitting and attached to the joining and connecting device in a known way, the joining and connecting device according to the invention gives the possibility of providing a correspondingly simple holding of the protective hose 60 on the joining and connecting device. Because of the attachment of the hose fittings 10 to be connected together by the half-shells 22, it is sufficient that the each protective hose 60 be pulled over the sleeve 12 of each hose fitting 10, so that this sleeve 12 or hose fitting 10 acts as a nipple of a hose connection. The protective hose 60 pulled on the outside of the sleeve 12 is attached to the sleeve 12 by means of an external pressing sleeve 61, which meshes in a known way with a projection 62 on the front side in a groove 63 formed in the sleeve and is thereby attached in an irreversible manner. By means of teeth 64 formed on the inside, the pressing sleeve 61 holds the protective sleeve firmly. Also, with such a design, the axial attachment of the protective caps 50 to be used can be used for additional security of the joining and connecting device against detachment, and for this, the position of the pressing sleeve 61 applied to the sleeve 12 and the width of the protective can 50 are determined with respect to each other in such a way that through protective cap 50 inserted between the half-shells 22 and the pressing sleeve 61, an axial movement of the hose fitting 10 into the half-shells 22 is excluded.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A connection assembly for a hose for conveying a fluid under a fluid pressure, the hose having a hose end, and the assembly comprising:

a fitting comprising:
- a generally tubular nipple extending along a longitudinal axis intermediate a first nipple end portion insertable in the hose end and a second nipple end portion;
- a fitting flange surrounding the nipple between the first and the second nipple end portion thereof, the fitting flange extending radially outwardly and having a forward face adjacent the second nipple end portion and an opposite rearward face; and
- a generally tubular sleeve disposed coaxially over the first nipple end portion, the sleeve having an inner sleeve surface radially spaced-apart from the first nipple end portion to define a generally annular space therebetween for receiving the hose end of the hose as the first nipple end portion is inserted thereinto, the sleeve being pressable onto the hose for retaining the hose end on the first nipple end portion;

a generally annular connector extending between a first connector end and a second connector end, the second nipple end portion being slidably receivable coaxially in the first connector end; and a generally tubular shell closable coaxially over the fitting, the shell having an internal cavity including a first cavity portion configured to receive the fitting flange therein and a second cavity portion configured to receive at least the first connector end, the first cavity portion having a forward wall and a rearward wall spaced apart axially from the forward wall end, and the shell being divided longitudinal into a first shall half and a second shell half closable with the first shell half to close the shell over the fitting, wherein with hose end being inserted into the annular space between the sleeve and the nipple and the sleeve being pressed onto the hose to retain the hose end on the nipple, the second nipple end portion being slidably received coaxially in the first connector end, and the first and second shell halves being closed over the fitting with the fitting flange being received in the first cavity portion with the fitting flange forward face being disposed adjacent the cavity forward wall and the fitting flange rearward face being disposed adjacent the cavity rearward wall, and with at least the first connector end being received in the second cavity, the fitting is slidably movable in the shell responsive to fluid pressure from the hose being received in the connector from a release position wherein the fitting flange rearward face is axially spaced-apart from the first cavity portion rearward face allowing the shell halves to be opened to a locked position wherein the fitting flange rearward face interferingly engages the first cavity portion rearward face preventing the shell halves from being opened.

2. The fitting of claim 1 wherein the fitting flange rearward face has a projection which extends axially therefrom, the projection being received within a groove formed in the rearward wall of the first cavity when the fitting is disposed in its locked position of the fitting, the projection interferingly engaging the groove in said locked position to prevent the shell halves from being opened.

3. The assembly of claim 1 wherein the second nipple end portion is retained within the connector as the fitting moves in the shell from the release position to the locked position.

4. The assembly of claim 3 further comprising a seal ring disposed coaxially between the second nipple end portion and the connector, the seal ring forming a fluid-tight seal between the second nipple end portion and the connector as the fitting moves in the shell from the release position to the locked position.

5. The assembly of claim 1 wherein the connector is immovably received with the second cavity portion.

6. The assembly of claim 1 wherein:
the fitting is a first said fitting and the hose is a first said hose, and the assembly comprises a second said fitting for a second said hose having a second said hose end, the shell internal cavity further including a third cavity disposed opposite the first cavity with the second cavity being disposed therebetween and the second connector end being disposed in the second cavity with the first connector end; and
with the second said hose end being inserted into the annular space between the sleeve and the nipple of the second said fitting and the sleeve being pressed onto the second said hose end to retain the second said hose end on the nipple, the second nipple end portion being slidably received coaxially in the second connector end, and the first and second shell halves being closed over the second said fitting with the flange thereof being received in the second cavity portion with the flange forward face thereof being disposed adjacent the third cavity forward wall and the flange rearward face thereof being disposed adjacent the third cavity rearward wall, the second said fitting is slidably movable in the shell responsive to fluid pressure from the second said hose being received in the connector from a release position wherein the flange rearward face is axially spaced-apart from the third cavity portion rearward face allowing the shell halves to be opened to a locked position wherein the flange rearward face interferingly engages the third cavity portion rearward face preventing the shell halves from being opened.

7. The assembly of claim 1 wherein the connector second end extends axially beyond the shell.

8. The assembly of claim 7 wherein the connector second end is threaded.

9. The assembly of claim 7 wherein:
the connector first end is configured as a radially outwardly extending connector flange having a forward face adjacent the fitting flange and an opposite rearward face;
the first cavity portion is configured to additionally receive the connector flange; and
with the connector flange being received in the first cavity portion with the connector flange forward face being disposed adjacent the fitting flange and the connector flange rearward face being disposed adjacent the cavity forward wall, the connector is slidably movable in the shell responsive to fluid pressure from the hose being received in the connector from a release position wherein the connector flange rearward face is axially spaced-apart from the first cavity portion forward face allowing the shell halves to be opened to a locked position wherein the connector flange rearward face interferingly engages the first cavity portion forward face preventing the shell halves from being opened.

10. The assembly of claim 1 wherein the connector flange rearward face has a projection which extends axially therefrom, the projection being received within a groove formed in the forward wall of the first cavity when the connector is disposed in its locked position of the fitting, the projection interferingly engaging the groove in said locked position to prevent the shell halves from being opened.

11. The assembly of claim 1 wherein:
the sleeve has an outer surface and a distal end which extends axially beyond the shell; and the assembly further comprises a cap retainable on the outer surface of the sleeve between the shell and the sleeve distal end when the fitting is disposed in its locked position, the cap being abuttingly engageable against the shell delimiting axial movement of the fitting from its locked position to its release position.

12. The assembly of claim 1 wherein:
the sleeve has an outer surface and a distal end which extends axially beyond the shell; and
the assembly further comprises:
a pressable second sleeve retained coaxially on the outer surface of the sleeve between the shell and the sleeve distal end; and
a protective hose having an end retained coaxially on the sleeve between the sleeve outer surface and the second sleeve.

* * * * *